(12) United States Patent
Ohtsuka et al.

(10) Patent No.: US 6,565,265 B2
(45) Date of Patent: May 20, 2003

(54) OPTICAL CONNECTOR AND METHOD OF ASSEMBLING OPTICAL CONNECTOR

(75) Inventors: Kenichiro Ohtsuka, Yokohama (JP);
Takahisa Yamaguchi, Yokohama (JP);
Tomohiko Ueda, Yokohama (JP);
Toshiaki Kakii, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/797,985

(22) Filed: Mar. 5, 2001

(65) Prior Publication Data

US 2001/0036341 A1 Nov. 1, 2001

Related U.S. Application Data

(60) Provisional application No. 60/191,456, filed on Mar. 23, 2000.

(51) Int. Cl.[7] .................................................. G02B 6/36
(52) U.S. Cl. ............................................ 385/78; 385/60
(58) Field of Search ............................ 385/59, 60, 65, 385/70, 71, 72, 78, 83, 85

(56) References Cited

U.S. PATENT DOCUMENTS

| 4,133,601 A | * | 1/1979 | Le Guen et al. ............... 385/81 |
| 4,770,487 A | * | 9/1988 | Williams ...................... 385/85 |
| 5,071,218 A | * | 12/1991 | Nishimoto ..................... 385/60 |
| 5,263,105 A | * | 11/1993 | Johnson et al. ................. 385/72 |
| 5,345,323 A | * | 9/1994 | Basavanhally et al. ........ 385/59 |
| 6,045,271 A | * | 4/2000 | Shimoji et al. ................ 385/85 |
| 6,074,100 A | * | 6/2000 | Rowland et al. ............... 385/78 |
| 6,257,770 B1 | * | 7/2001 | Sato ............................. 385/78 |

FOREIGN PATENT DOCUMENTS

| JP | 58-102911 | 6/1983 |
| JP | 59-036213 | 2/1984 |
| JP | 61-156207 | 7/1986 |
| JP | 63-155011 | 6/1988 |
| JP | 3-148610 | 6/1991 |
| JP | H3-114805 | 11/1991 |
| JP | H4-79308 | 7/1992 |
| JP | 05-181074 | 7/1993 |
| JP | 10-020151 | 1/1998 |

* cited by examiner

Primary Examiner—Lynn D. Feild
Assistant Examiner—Son V. Nguyen
(74) Attorney, Agent, or Firm—McDermott, Will & Emery (57) ABSTRACT

An optical connector comprising a ferrule including an optical fiber, wherein a hollow portion for optical fiber protrusion is formed on a front end face of the ferrule, the optical fiber is inserted into an optical fiber positioning hole extended from an optical fiber protrusion port provided on a bottom face of the hollow portion toward an inside of the ferrule, and a tip face of the optical fiber is drawn in the hollow portion. This makes it possible to provide an optical connector which can shorten a time for assembly and can be assembled easily and inexpensively.

9 Claims, 10 Drawing Sheets

OPTICAL CONNECTOR AND METHOD OF ASSEMBLING OPTICAL CONNECTOR

This application claims the benefit of Provisional application No. 60/191,456, filed Mar. 23, 2000.

BACKGROUND OF THE INVENTION

1. Field of the Invention

The present invention relates to an optical connector, and more particularly to an optical connector for mutually connecting optical fibers.

2. Related Background Art

Conventionally, in the case in which an optical connector is to be assembled at a job site, an adhesive is poured into an optical fiber inserting hole provided in a ferrule, the optical fiber is inserted therein and is fixed with the adhesive in the ferrule and the connecting end face of the optical connector is then polished. Consequently, the connecting end face of the optical connector is on the level with the tip face of the optical fiber so that the ferrules can be reliably coupled to each other. Such an example includes Japanese Patent Application Laid-Open No. 61-156207.

SUMMARY OF THE INVENTION

However, the conventional optical connector, which has the above-mentioned structure, has been the following problem. More specifically, such an optical connector requires a precise end face polishing step due to the fact that the adhesive sticks to the tip face at an adhesive assembling step to be carried out at the site. Consequently, it takes a long time to assemble the optical connector. In addition, expensive equipment is required for the precise polishing.

The present invention has been made to solve the above-mentioned problem and has an object to provide an optical connector which can shorten a time required for assembly and can be assembled easily and inexpensively.

The present invention provides an optical connector comprising a ferrule including an optical fiber, wherein a hollow portion for optical fiber protrusion is formed on a front end face of the ferrule, the optical fiber is inserted into an optical fiber positioning hole extended from an optical fiber protrusion port provided on a bottom face of the hollow portion toward an inside of the ferrule, and a tip face of the optical fiber is drawn in the hollow portion.

According to the optical connector of the present invention, the tip face of the optical fiber is not protruded from (or on the level with) the front end face of the ferrule but is drawn in the hollow portion formed on the front end face of the ferrule. In the hollow portion, accordingly, a free space exists in the vicinity of the tip face of the optical fiber. Consequently, in the case in which refuse or the like sticks to the tip face of the optical fiber, a wiping work can be considerably simplified and optical characteristics can be maintained easily and reliably. For example, the wiping work can be carried out with an applicator containing a cleaning solution. Even if the finishing precision of the tip face of the optical fiber is not increased, optical connection having a low loss can be implemented and the conventional precise polishing step can be simplified. Consequently, a time required for treating the end face can be shortened and a time required for assembling the optical connector can be reduced.

Preferably, the hollow portion has a rectangular opening window. As a consequence, a cleaning member such as an applicator can be easily inserted in the hollow portion because of the rectangular opening window.

Preferably, the hollow portion has a slit-shaped opening window. As a consequence, a cleaning member such as an applicator can be easily moved greatly along the hollow portion because of the slit-shaped opening window.

Preferably, the hollow portion has a depth of 20 $\mu$m or more. As a consequence, a distance between the front end face of the ferrule and the tip face of the optical fiber (the lead-in amount of the optical fiber) can be maintained easily.

Preferably, the tip face of the optical fiber is subjected to an edge removal treatment by an electron discharge machining. As a consequence, the optical fiber can be inserted into the optical fiber positioning hole of the ferrule with the tip of the optical fiber electrically rounded. Accordingly, the optical fiber can be inserted easily. In addition, it is possible to properly prevent the tip face of the optical fiber from being chipped and to rapidly carry out the work.

Preferably, the tip face of the optical fiber is subjected to an edge removal treatment by a polishing. As a consequence, the optical fiber can be inserted easily with the tip of the optical fiber mechanically rounded. In addition, it is possible to properly prevent the tip face of the optical fiber from being chipped and to rapidly carry out the work.

Preferably, plural optical fiber protrusion ports are provided on the bottom face of the hollow portion corresponding to the number of the optical fibers. As a consequence, it is possible to roughly cut the tip portion of the optical fiber in a slight misalignment state with a predetermined alignment error even if the tip face of the optical fiber is not cut to be aligned with high precision at the previous step of inserting each optical fiber into the ferrule. As a result, the cutting work can be carried out rapidly and a time required for assembling the optical connector can be shortened.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
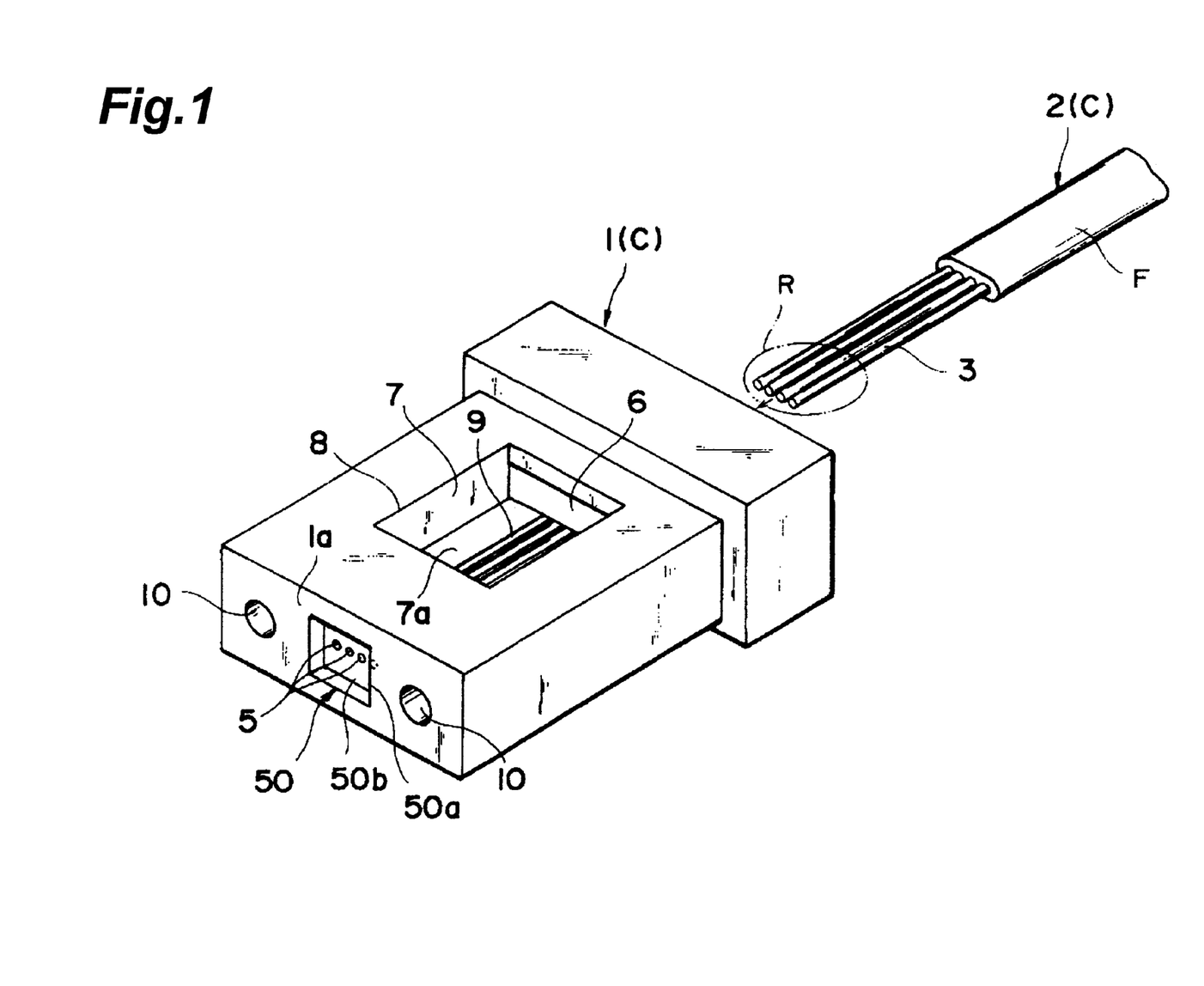
FIG. 1 is a perspective view showing a ferrule and an optical fiber which are to be utilized for an optical connector according to the present invention.

The embodiments of the optical connector of the present invention will be described with reference to the accompanying drawings. Note that the same reference numerals denote the same parts throughout the drawings, and a repetitive description will be avoided. FIG. 1 is a perspective view showing a ferrule and an optical fiber which are applied to the optical connector according to the present invention. The ferrule 1 shown in FIG. 1 is made of a resin (or zirconia or glass) in the form of an almost rectangular parallelepiped, and is utilized as a part of the optical connector (for example, a MT connector). Moreover, the ferrule 1 is incorporated and utilized as a part of another connector or the like in some cases.

Figure 2:
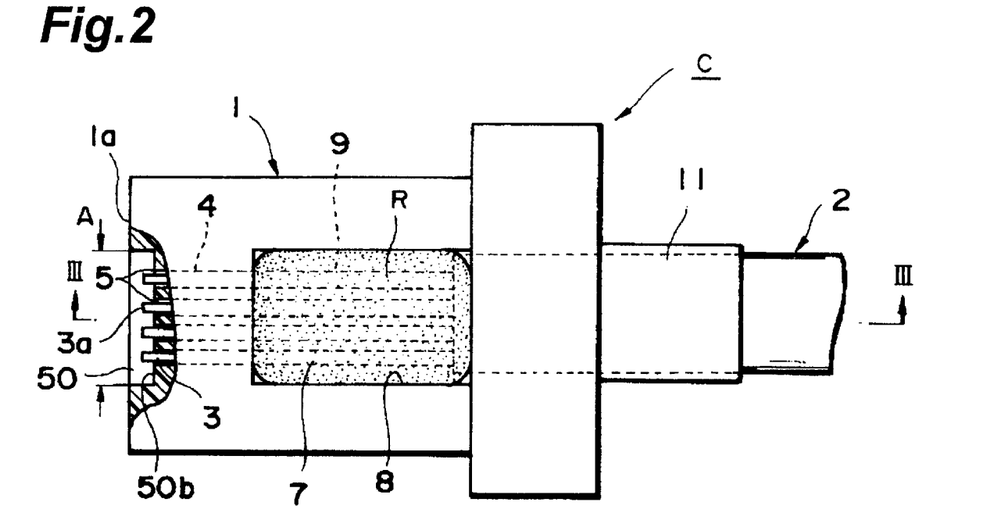
FIG. 2 is a plan view showing the optical connector in a state in which the optical fiber is attached to the ferrule.
Figure 3:
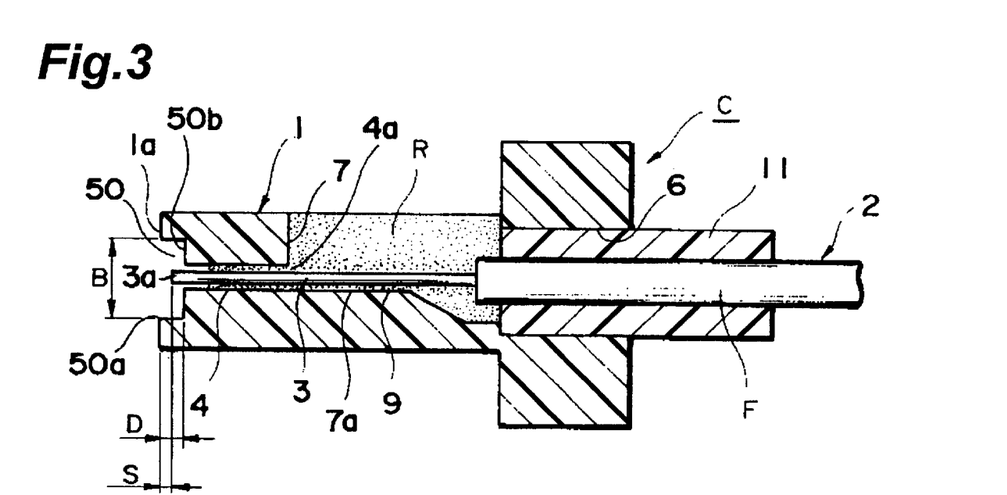
FIG. 3 is a sectional view taken along the line III—III in FIG. 2.

As shown in FIGS. 1 to 3, a hollow portion 50 for optical fiber protrusion having a width A (3 mm), a height B (1.5 mm) and a depth D (0.03 mm) is formed on the center of a front end face 1a of the ferrule 1. The hollow portion 50 has a rectangular opening window 50a. Four optical fiber positioning holes 4 are formed on a front part in the ferrule 4. Each of the optical fiber positioning holes 4 serves to perform positioning by inserting four (four-core) optical fibers 3 exposed from the tip of a ribbon-shaped optical fiber 2 (which will be hereinafter referred to as a "optical fiber ribbon") respectively and has a diameter of 126 μm to 127 μm for the optical fiber 3 having a diameter of 125 μm. Each optical fiber positioning hole 4 is extended from a bottom face 50b of the hollow portion 50 rectilinearly in parallel, and the front end opening of the optical fiber positioning hole 4 is formed as an optical fiber protrusion port 5. Accordingly, the four optical fiber protrusion ports 5 are aligned on the bottom face 50b of the hollow portion 50. An optical fiber inlet 6 for introducing the optical fiber 3 from the outside is provided in the rear portion of the ferrule 1.

Furthermore, an adhesive filling hollow portion 7 for accommodating an adhesive R is provided between the optical fiber inlet 6 and the optical fiber positioning hole 4, and an adhesive filling window 8 forming a rectangular opening into which the adhesive is poured is formed on the top of the adhesive filling hollow portion 7. Four optical fiber alignment grooves 9 extended along the overall length are formed on a bottom face 7a of the adhesive filling hollow portion 7. Each optical fiber alignment groove 9 is positioned on the extension of each optical fiber positioning hole 4, and is extended between the optical fiber positioning hole 4 and the optical fiber inlet 6. Furthermore, each optical fiber alignment groove 9 is formed to have a C-shaped section and is extended to have the same diameter as the diameter of the optical fiber positioning hole 4 (see FIG. 13). A guide pin inserting hole 10 for inserting a guide pin (not shown) is formed on both sides of the hollow portion 50 over the front end face 1a of the ferrule 1.

The optical fiber 3 inserted from the optical fiber inlet 6 of the ferrule 1 is provided in the optical fiber positioning hole 4 along the optical fiber alignment groove 9. In this case, while a tip face 3a of the optical fiber 3 is protruded from the optical fiber protrusion port 5, it is led in with a retreat amount S of approximately 5 μm to 10 μm with respect to the front end face 1a of the ferrule 1 and is drawn in the hollow portion 50. In consideration thereof, it is preferable that the depth of the hollow portion 50 should be set to 20 μm or more. Moreover, when the adhesive R is filled in the adhesive filling hollow portion 7, the optical fiber 3 can be fixed to the optical fiber alignment groove 9 through the adhesive R. This implements the firmer fixation of the optical fiber 3 to the ferrule 1. In this case, since a difference between the diameters of the optical fiber 3 and the optical fiber positioning hole 4 is very small, the adhesive R rarely flows from a rear end 4a side of the optical fiber positioning hole 4.

An optical connector C having such a structure does not depend on the shape of the tip face 3a of the optical fiber 3 and is readily applicable to the MT (Mechanically Transferable) connector which can perform high-speed switching for a CATS (Cable Transfer System) or the like. More specifically, it is not necessary to enhance the cutting precision or polishing precision of the tip face 3a of the optical fiber 3 and a time required for a work of attaching the optical fiber 3 to the ferrule 1 can be shortened greatly. Moreover, since the tip face 3a of the optical fiber 3 is not protruded from the front end face 1a of the ferrule 1, an operator does not touch the tip end face 3a of the optical fiber 3 carelessly during handling.

Furthermore, a step of precisely polishing the front end face 1a of the ferrule 1 is not required at the final stage of fixing the optical fiber 3 to the ferrule 1. Consequently, the time required for working can be shortened greatly. In addition, it is possible to prevent the tip face 3a of the optical fiber 3 from being chipped during polishing. A retreat amount (withdrawal amount) S of the optical fiber 3 is set such that the tip face 3a of the optical fiber 3 is not protruded from the front end face 1a of the ferrule 1 even if a temperature is changed in consideration of a coefficient of linear expansion of a member forming the optical connector C. By inserting a boot 11 made of rubber which is fitted in the optical fiber 3 into the optical fiber inlet 6 of the ferrule 1, the optical fiber 2 can be prevented from being bent.

An example of a method for assembling the optical connector C having such a structure will be described below.

Figure 4:
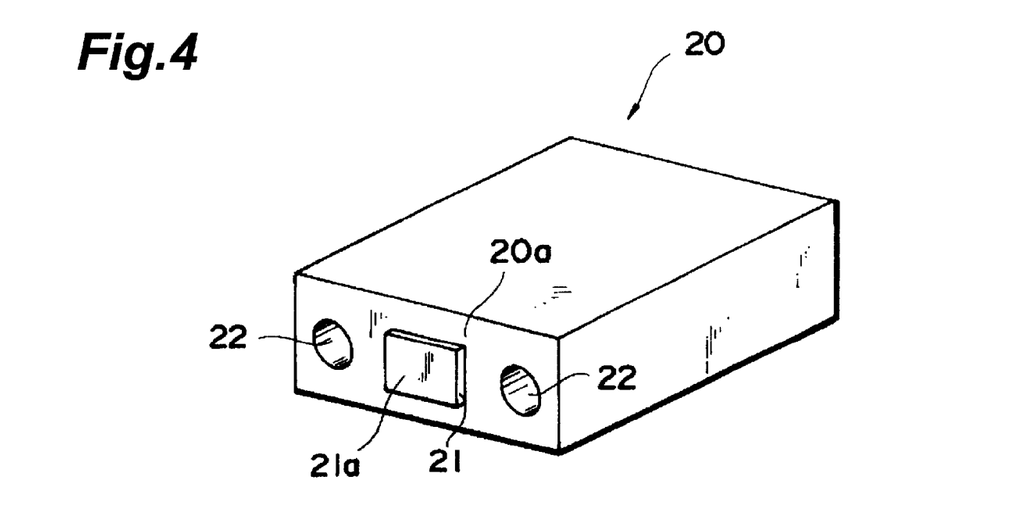
FIG. 4 is a perspective view showing an optical fiber press member to be utilized for assembling the optical connector according to the present invention.

In order to carry out this method, an optical fiber press member 20 made of a resin in the form of an almost rectangular parallelepiped is prepared as shown in FIG. 4. The front face of the optical fiber press member 20 is provided with a flat ferrule connecting face 20a to abut on the front end face 1a of the ferrule 1. The ferrule connecting face 20a is provided with a positioning protrusive portion 21 having the shape of a square pole to be inserted in the hollow portion 50 of the ferrule 1, and the positioning protrusive portion 21 is formed to have such a size to be fitted in the hollow portion 50. The tip of the positioning protrusive portion 21 is provided with a flat rectangular optical fiber press face 21a. The optical fiber press face 21a is protruded from the ferrule connecting face 20a by approximately 5 to 10 μm. This corresponds to an amount in which the tip face 3a of the optical fiber 3 can retreat from the front end face 1a of the ferrule 1. Moreover, a guide pin inserting hole 22 corresponding to each guide pin inserting hole 10 of the ferrule 1 is provided. The optical fiber press member 20 having such a structure is prepared before the work.

Figure 5:
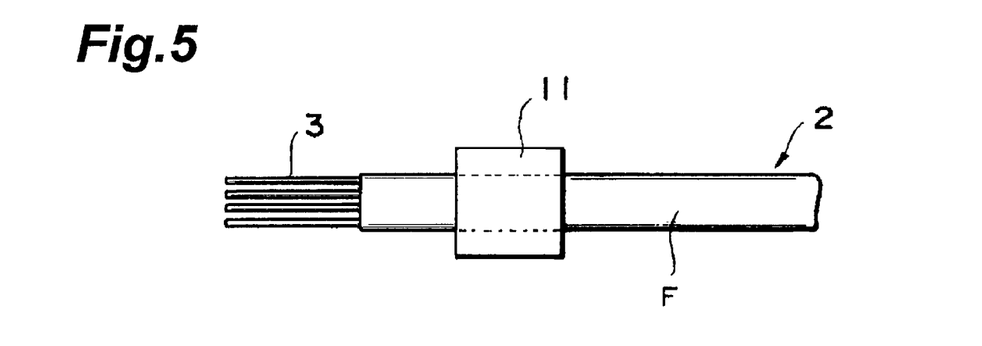
FIG. 5 is a plan view showing the optical fiber cut to have a predetermined length.
Figure 6:
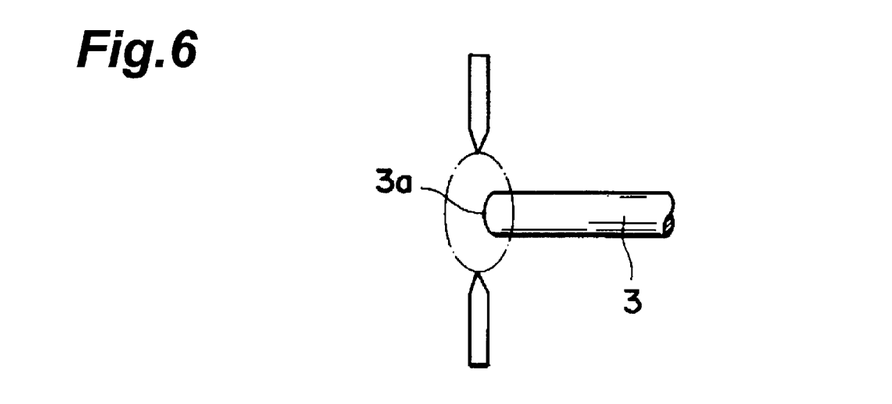
FIG. 6 is an enlarged view showing the discharging state of the optical fiber.
Figure 7:
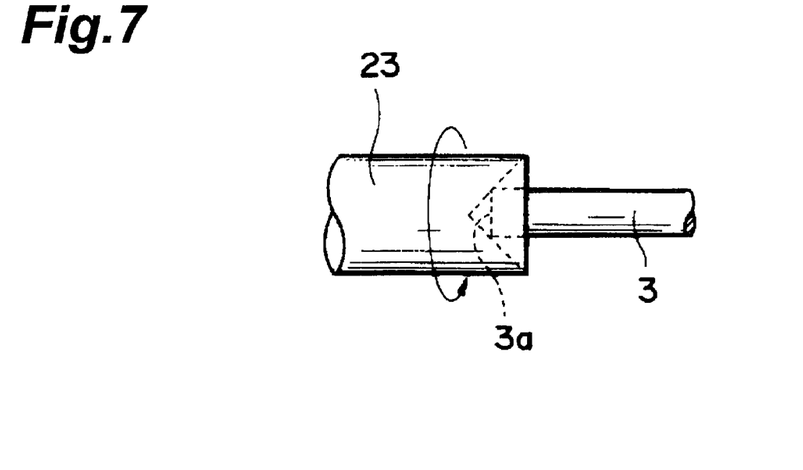
FIG. 7 is an enlarged view showing the polishing state of the optical fiber.

As shown in FIG. 5, first of all, the optical fiber 2 is inserted into the boot 11 made of rubber, and a covering portion F having a predetermined length is removed from the tip portion of the optical fiber 2 by a heating type remover or the like, and a covering waste is wiped off with alcohol or the like with the four optical fibers 3 exposed. After the optical fibers 3 are cut to have a predetermined length by means of a cleaver or the like such that they are aligned, the tip face 3a of the optical fiber 3 is subjected to an edge removing treatment by the discharging work as shown in FIG. 6. This is intended for preventing the end face from being chipped by the contact of the optical fiber 3 with the ferrule 1 when the optical fiber 3 is to be inserted into the ferrule 1 and for rapidly carrying out the inserting work. For the same edge treatment, the tip face 3a of the optical fiber 3 may be mechanically treated by a polishing rotor 23 or a manual work as shown in FIG. 7.

Figure 8:
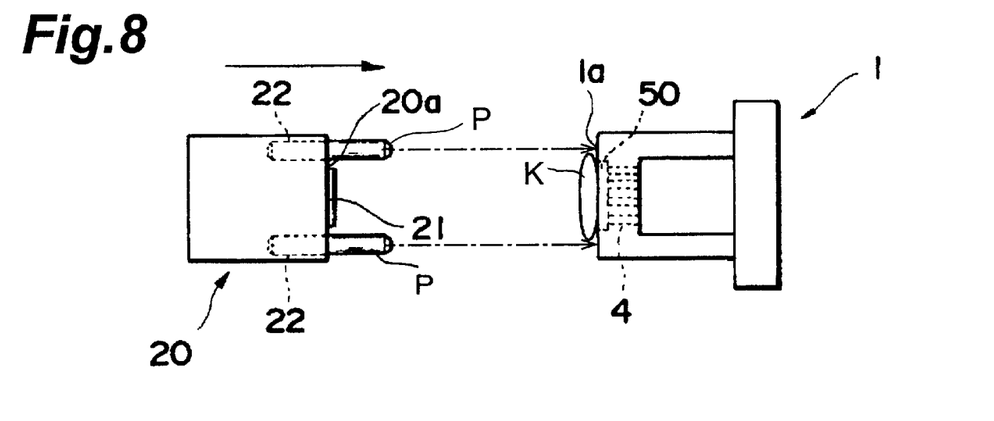
FIG. 8 is a plan view showing the state in which the optical fiber press member has not been assembled into the ferrule.

As shown in FIG. 8, next, a grease-like silicon based refractive index matching material K is applied onto the front end face 1a of the ferrule 1 such that it enters the hollow portion 50 of the front end face 1a of the ferrule 1. Then, the exposed end side of the guide pin P is inserted in the guide pin inserting hole 10 of the ferrule 1 (see FIG. 1) with the guide pin P inserted in the guide pin inserting hole 22 of the optical fiber press member 20. With the positioning protrusive portion 21 of the optical fiber press member 20 entering the hollow portion 50 of the ferrule 1 by the induction of the guide pin P, the ferrule connecting face 20a of the optical fiber press member 20 is pressed against the front end face 1a of the ferrule 1. As a result, the optical fiber press face 21a enters the hollow portion 50 by approximately 5 to 10 μm with the index matching material K entering the hollow portion 50 (see FIG. 10). In order to maintain this state, the ferrule 1 and the optical fiber press member 20 may be interposed and fixed on both sides by means of a clip which is not shown.

Figure 9:
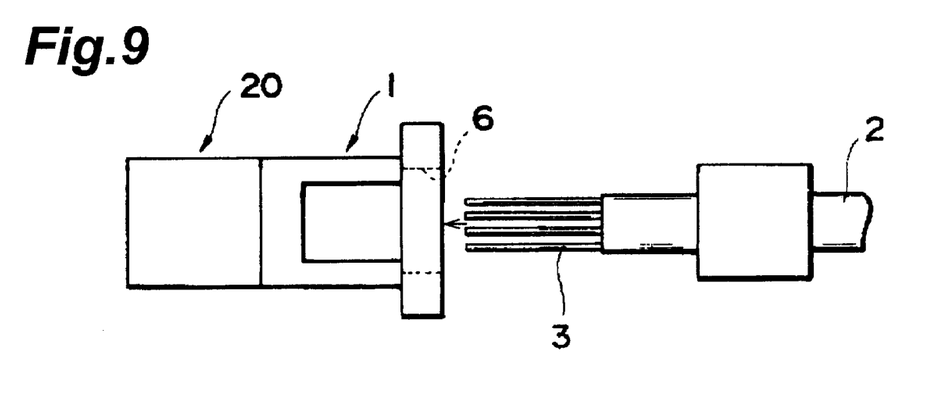
FIG. 9 is a plan view showing the state in which the optical fiber press member has been assembled into the ferrule.
Figure 10:
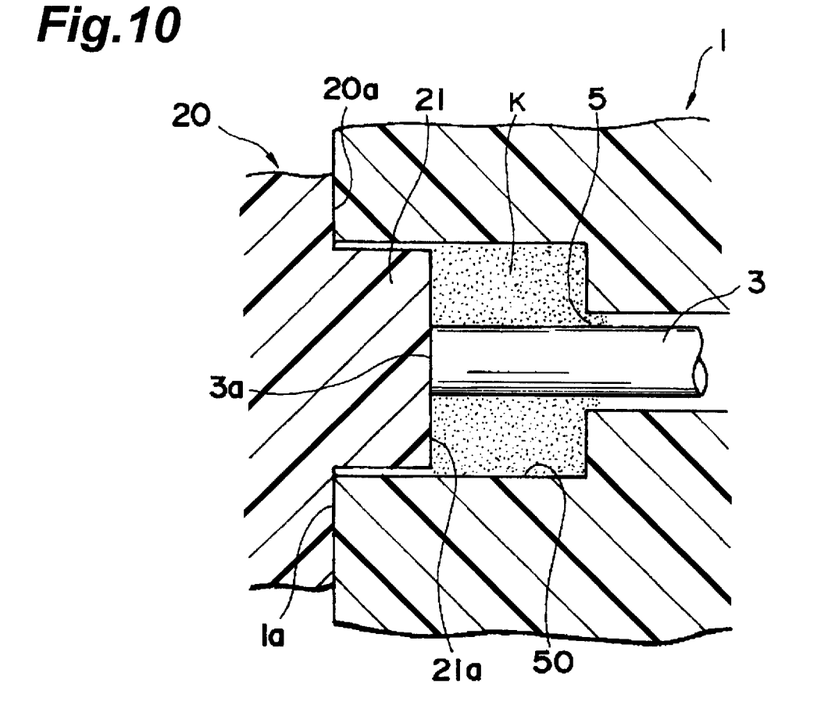
FIG. 10 is an enlarged sectional view showing a main part in the state in which the optical fiber is inserted in the ferrule.

As shown in FIG. 9, then, the optical fibers 3 are inserted from the optical fiber inlet 6 of the ferrule 1. Thus, the optical fibers 3 are inserted in the optical fiber positioning holes 4, respectively. As shown in FIG. 10, the optical fiber 2 is advanced to such an extent that the tip face 3a of the optical fiber 3 abuts on the optical fiber press face 21a of the positioning protrusive portion 21. As a result, the tip face 3a of the optical fiber 3 retreats to be led in by approximately 5 to 10 μm (corresponding to the amount of protrusion of the positioning protrusive portion 21) with respect to the front end face 1a of the ferrule 1, and is drawn in the hollow portion 50. Furthermore, the hollow portion 50 is filled with the silicon based refractive index matching material K, and the tip face 3a of the optical fiber 3 is completely drawn in the indexmatching material K.

Figure 11:
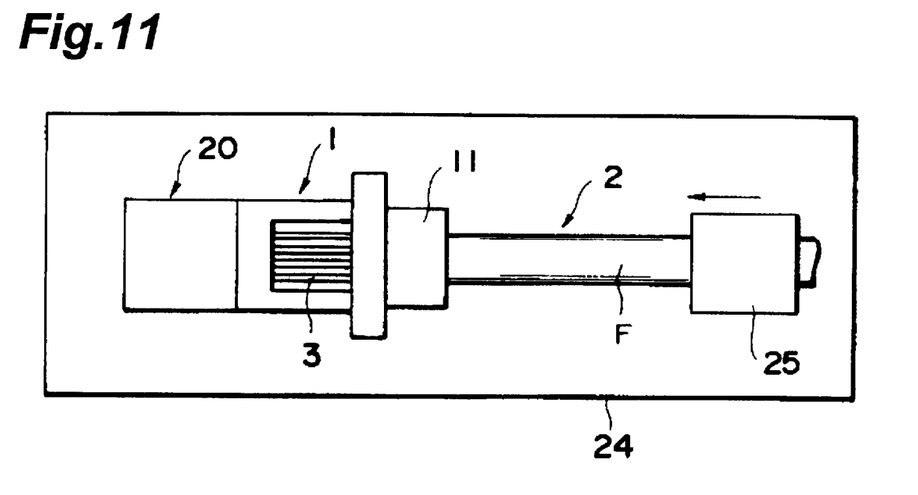
FIG. 11 is a plan view showing the state in which an alignment load is applied to the optical fiber.

Furthermore, a misalignment of approximately several μm is generated on the tip face 3a of the optical fiber 3 during cutting. Therefore, it is necessary to align the tip faces 3a in order to eliminate an optical connection loss caused by the misalignment. As shown in FIG. 11, therefore, the ferrule 1 and the optical fiber positioning member 20 are fixed onto a base plate 24 and the covering portion F of the optical fiber 2 is held by means of a fiber holder 25 which can be slid over the base plate 24 in a longitudinal direction. In this state, pressure is applied forward to give such an alignment load that the tip faces 3a of all the optical fibers 3 abut on the optical fiber press face 21a of the positioning protrusive portion 21 (such a load as to give 0.2 kgf (about 1.96 N), for example, to the four optical fibers 3 forward).

Figure 12:
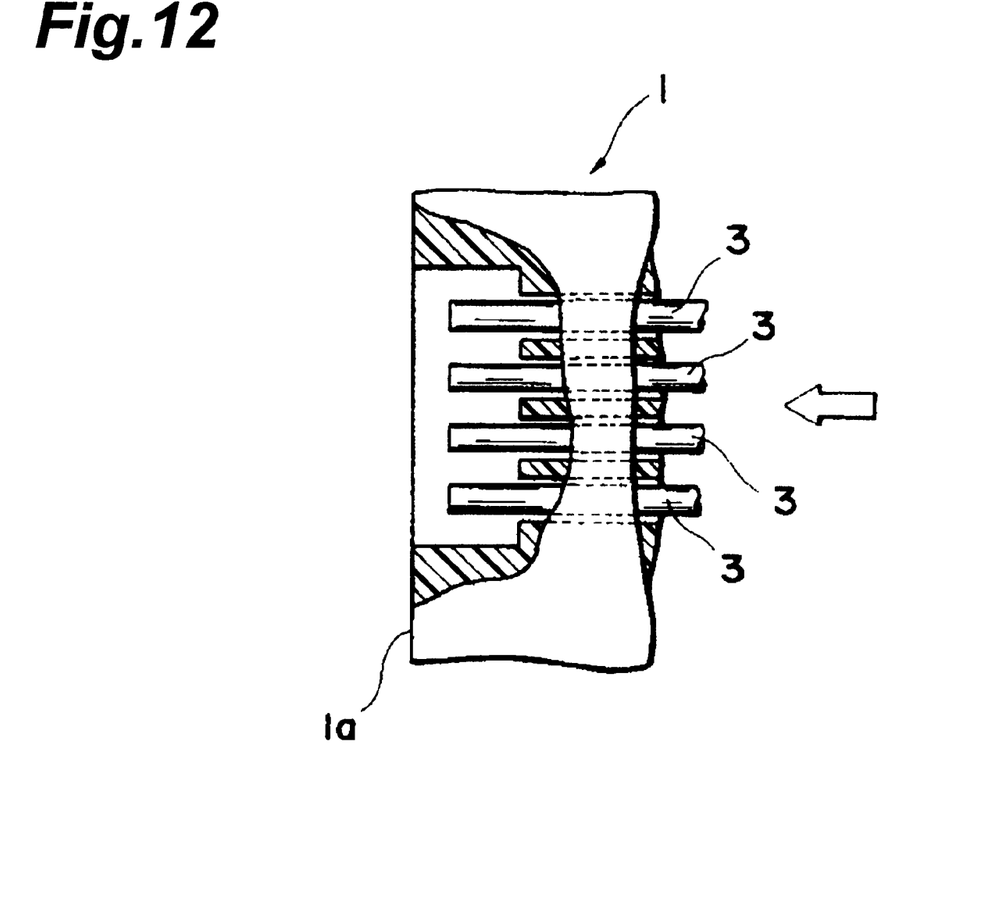
FIG. 12 is a sectional view showing the state in which the tip faces of the optical fibers are aligned.
Figure 13:
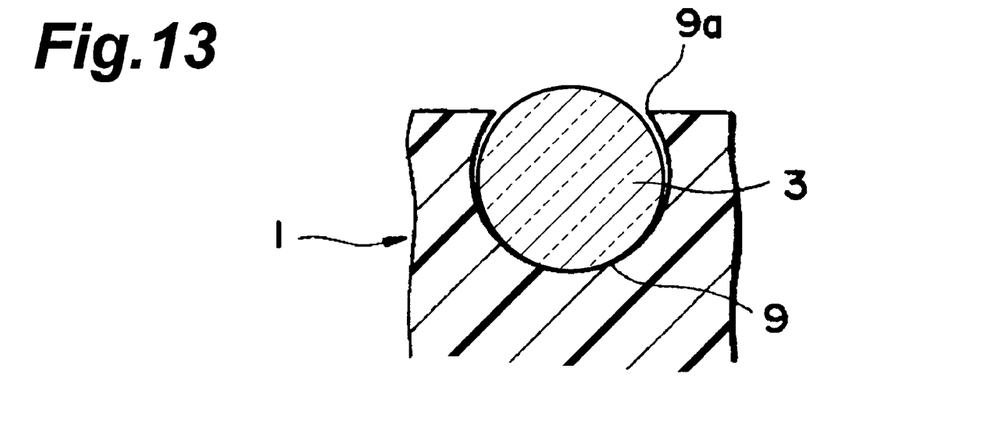
FIG. 13 is an enlarged sectional view showing an optical fiber alignment groove having a C-shaped section.

Consequently, the tip face 3a of the optical fiber 3 is forcibly aligned as shown in FIG. 12. In this case, it is necessary to absorb an amount of the optical fiber 3 to be compressed. As shown in FIG. 13, therefore, it is preferable that the optical fiber alignment groove 9 should have a C-shaped section and a slit-shaped opening 9a having a smaller width than the diameter of the optical fiber 3 should be formed over the optical fiber alignment groove 9. By providing such an opening 9a, the optical fiber 3 can be prevented from jumping out so that the adhesive R can flow into the optical fiber alignment groove 9.

Figure 14:
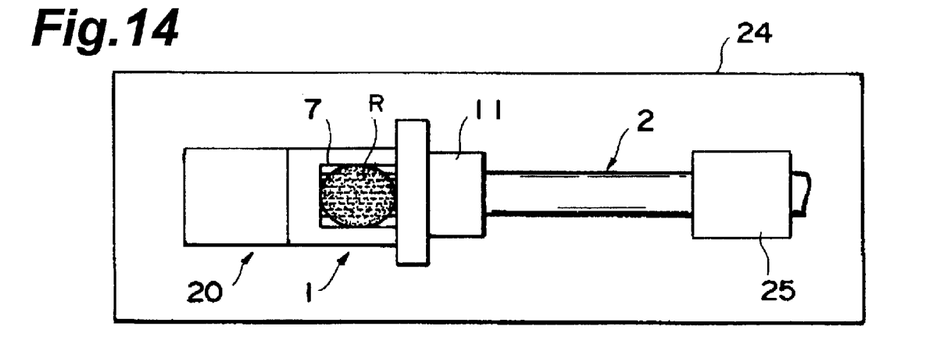
FIG. 14 is a plan view showing the state in which the ferrule is filled with an adhesive.

As shown in FIG. 14, then, the adhesive filling hollow portion 7 of the ferrule 1 is filled with an epoxy based thermosetting type adhesive R. In this state, the ferrule 1 is properly heated by a heater which is not shown so that the adhesive R is cured. At the final step, the ferrule 1 and the optical fiber 3 slightly change their dimensions by expansion and contraction (particularly, the ferrule 1 made of a resin is greatly expanded and contracted). However, the tip face 3a of the optical fiber 3 is previously led in. Therefore, the tip face 3a of the optical fiber 3 is not protruded from the front end face 1a of the ferrule 1.

Figure 15:
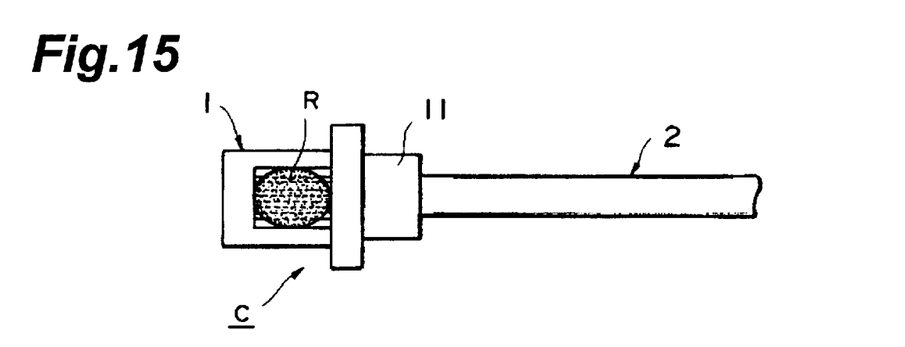
FIG. 15 is a plan view showing the optical connector in which the optical fiber has been completely attached to the ferrule.

As shown in FIG. 15, the optical fiber press member 20 is removed from the ferrule 1. Consequently, the work for assembling the optical fiber 2 into the ferrule 1 is completed with the tip face 3a of the optical fiber 3 aligned reliably (see FIG. 12). The refractive index matching material K in the hollow portion 50 is cleaned and removed after the assembling work if necessary. Moreover, the expansion and contraction of the ferrule 1 and the optical fiber 3 can be prevented by using a ultraviolet curing adhesive or a room temperature curing adhesive for the adhesive R. In the case in which refuse or the like sticks to the tip face 3a of the optical fiber 3 protruded in the hollow portion 50, it is preferable that the tip portion of the optical fiber 3 should be cleaned by inserting and turning a cleaning member such as an applicator in the hollow portion 50. Thus, the hollow portion 50 also serves to easily clean the tip face 3a of the optical fiber 3.

Figure 16:
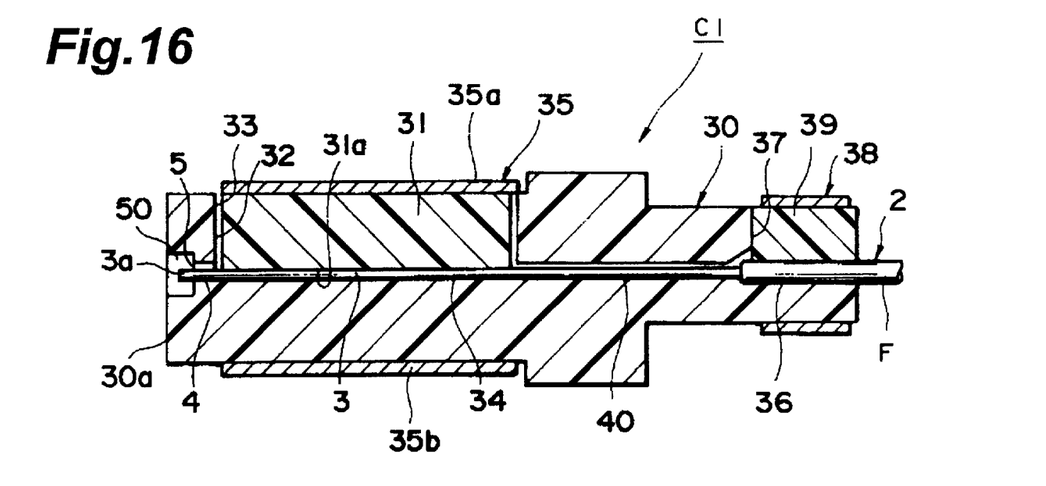
FIG. 16 is a sectional view showing an optical connector according to a second embodiment.
Figure 17:
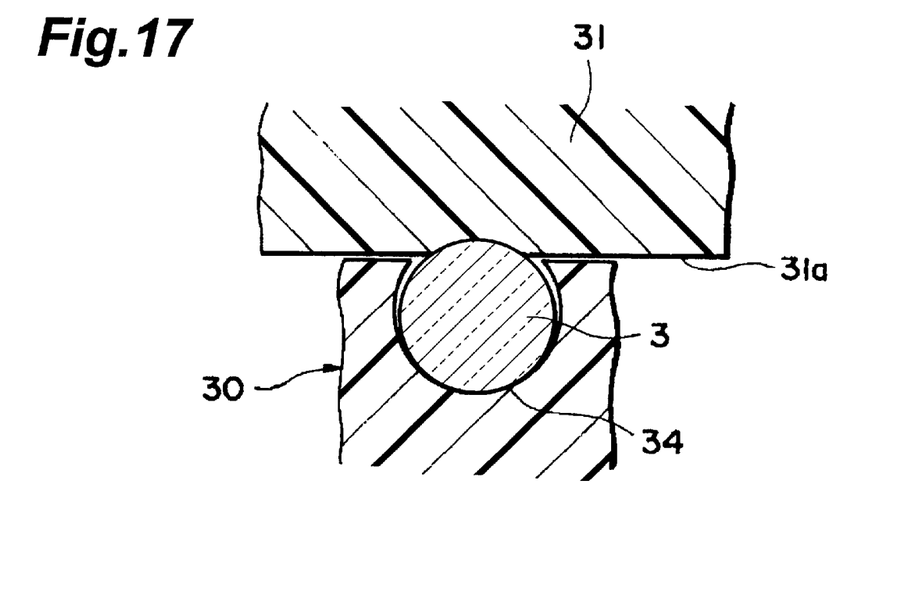
FIG. 17 is an enlarged sectional view showing the state in which an optical fiber is provided in the optical fiber alignment groove of a ferrule and is pressed from above by means of a clamp member.

Next, another optical connector C1 according to the present invention will be described. The components, which are identical or similar to those of the optical connector C, have the same reference numerals. As shown in FIG. 16, a ferrule 30 to be applied to the optical connector C1 is provided with a housing 32 for a fiber press fixing member for accommodating a block-shaped fiber press fixing member 31, and the top of the housing 32 is formed as a rectangular opening 33 for inserting the fiber press fixing member 31 therein. Four optical fiber alignment grooves 34 extended over the whole length are formed on the bottom face of the housing 32. When the fiber press fixing member 31 is inserted from the opening 33, the four optical fibers 3 in the optical fiber alignment groove 34 can be pressed downward at one time by a lower face 31a of the fiber press fixing member 31 (see FIG. 17).

The optical connector C1 has a spring member 35 for energizing the fiber press fixing member 31 inserted into the housing 32. The spring member 35 is constituted as a clamp member having a U-shaped section which is extended from the upper face of the ferrule 30 to the lower face thereof. The fiber press fixing member 31 is elastically held in the housing 32 by means of the clamp member 35. Accordingly, each optical fiber 3 in each optical fiber alignment groove 34 can be firmly fixed to the ferrule 30 with a predetermined fixed load by utilizing the clamp member 35.

The material of the clamp member 35 is phosphorus bronze or stainless steel which has been subjected to cold working. Consequently, the clamp member 35 can have strong spring force and high durability. Thus, long-term reliability of clamp force can be ensured. Moreover, the clamp member 35 is formed to have a U-shape by an upper plate-shaped piece 35a, a lower plate-shaped piece 35b and an intermediate piece for coupling them (which is not shown), thereby generating proper clamp force by the upper piece 35a of the clamp member 35.

Furthermore, the optical connector C1 has a block-shaped covering portion press fixing member 39 for fixing a covering portion F of a optical fiber ribbon 2 to the ferrule 30 in addition to the fiber press fixing member 31 for fixing the optical fiber 3 to the ferrule 30.

An optical fiber guide hole 40 extended rearward from the optical fiber alignment groove 34 is provided in the ferrule 30, and a covering portion inserting member 36 is positioned therebehind. The covering portion inserting member 36 has at least such a width as to accommodate the covering portion F of the optical fiber ribbon 2. A housing 37 for the covering portion press fixing member is formed as a notch on the rear end of the ferrule 30 in parallel with the housing 32 for the fiber press fixing member. The covering portion press fixing member 39 can be provided in the housing 37. Moreover, the optical connector C1 has a spring member 38 for energizing the covering portion press fixing member 39 in the housing 37. The spring member 38 is constituted as a clamp member having a U-shaped section which is extended from the upper face of the ferrule 30 to the lower face thereof. The covering portion press fixing member 39 is elastically held in the housing 37 by means of the clamp member 38.

In the same manner as the optical connector C, a hollow portion 50 for optical fiber protrusion is provided on the center of a front end face 30a of the ferrule 30 and the tip face 3a of the optical fiber 3 is not protruded from the front end face 30a of the ferrule 30 but is drawn in the hollow portion 50.

Figure 18:
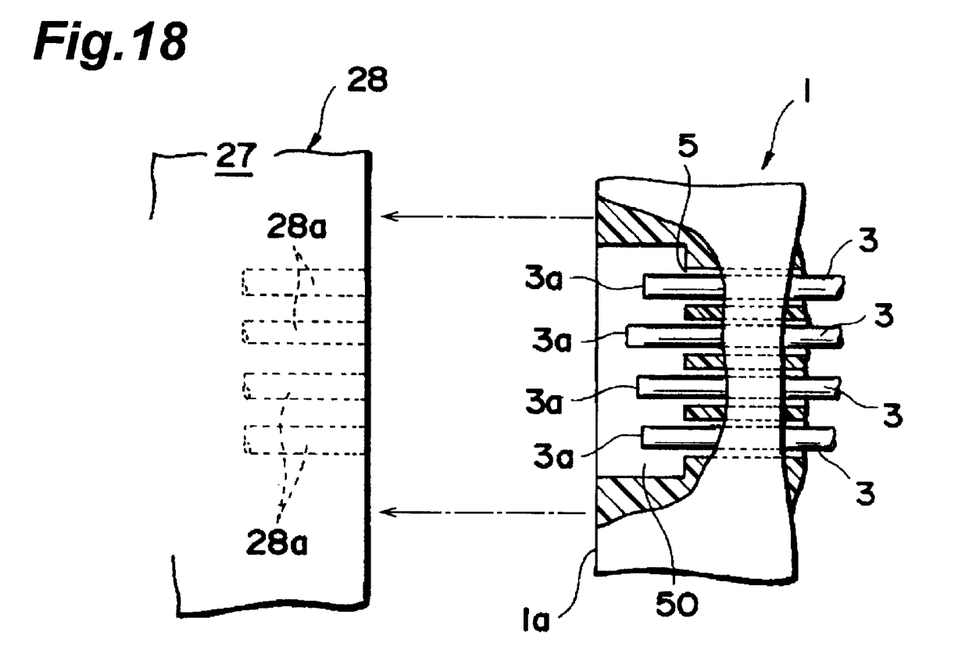
FIG. 18 is a plan view showing the state in which the tip face of the optical fiber is drawn in the ferrule in a non-alignment state.

An optical connector according to a further embodiment of the present invention will be described below. As shown in FIG. 18, tip faces 3a of four optical fibers 3 may not be aligned but be provided in a hollow portion 50. More specifically, in the case in which the tip face 3a of each optical fiber 3 is drawn in the hollow portion 50, the amount of the optical fiber 3 protruded from an optical fiber protrusion port 5 may be uneven. The reason is that independent optical connection is carried out in the respective optical fibers 3. In other words, when four optical fibers 28a provided on a ferrule 28 of another optical connector. 27 are to be optically connected to the optical fiber 3 of a ferrule 1, the optical fiber 3 performs independent optical connection to the optical fiber 28a.

By drawing the tip face 3a of the optical fiber 3 in the hollow portion 50 of the ferrule 1, the following advantages can further be obtained. More specifically, it is possible to roughly cut the tip portion of the optical fiber 3 in a slight misalignment state with an alignment error of several $\mu$m even if the tip face 3a of the optical fiber 3 is not cut to be aligned with high precision at the previous step of inserting the optical fiber 3 into the ferrule 1. As a result, the cutting work can be carried out rapidly. In this case, even if the tip face of the optical fiber 3 is obliquely cut, the connection is affected with difficulty. Moreover, also after the optical fiber 3 in the misalignment state of the end face is incorporated in the ferrule 1, it is not necessary to align and cut the tip portion of the optical fiber 3 again. Consequently, the work of assembling the optical fiber 3 can be carried out very rapidly. Furthermore, a change in the amount of protrusion of the optical fiber 3 caused by a coefficient of thermal expansion can also be permitted. When the tip face 3a of the optical fiber 3 is rounded by a discharging work at the previous step of inserting the optical fiber 3 into the ferrule 1, the optical fiber 3 can easily be inserted into an optical fiber positioning hole 4 and so is the ferrule 30.

Figure 19:
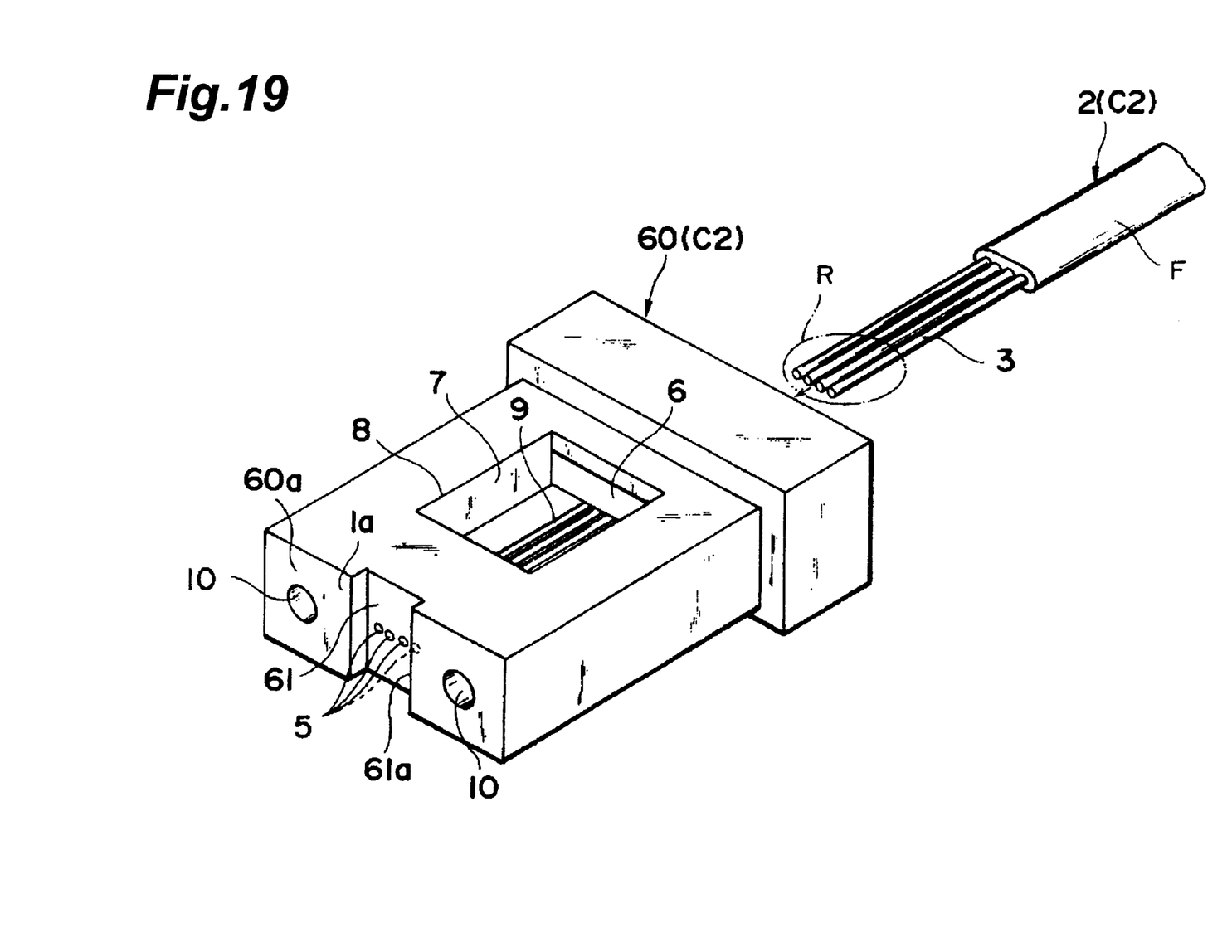
FIG. 19 is a perspective view showing an optical connector according to a third embodiment.

The optical connector according to the present invention is not restricted to various embodiments described above. For example, a hollow portion 61 having a slit-shaped opening window 61a may be provided on the center of a front end face 60a of a ferrule 60 in an optical connector C2 as shown in FIG. 19. In this case, it is easy to greatly move a cleaning member such as an applicator along the hollow portion 61. The opening window 61a may be formed slenderly in the transverse direction to include a guide pin inserting hole 10 on both sides over the front end face 60a of the ferrule 60.

Figure 20:
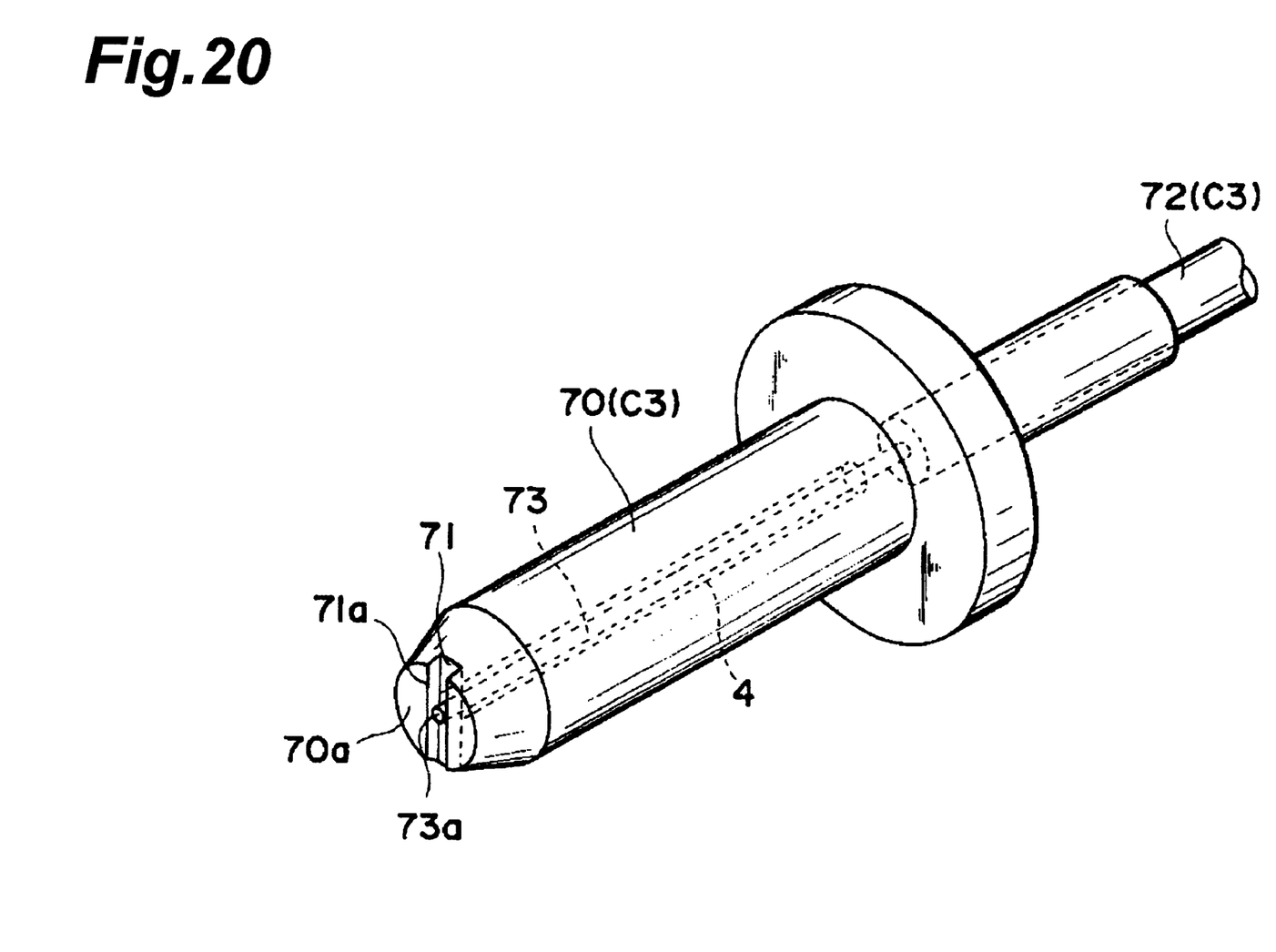
FIG. 20 is a perspective view showing an optical connector according to a fourth embodiment.

As a matter of course, the coverage of the optical connector described above includes multi-fiber optical connectors of other types and single core optical connectors of SC and MU types in addition to an optical connector of an MT type. As shown in FIG. 20, for example, a hollow portion 71 having a slit-shaped opening window 71a may be provided on the center of a front end face 70a of a cylindrical ferrule 70 in a single core optical connector C3. In this case, an optical fiber 72 having a single core is utilized and a tip face 73a of an optical fiber 73 is drawn in the hollow portion 71.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical connector comprising a ferrule including an optical fiber, wherein a hollow portion is formed on a front end face of said ferrule, an optical fiber protrusion port, from which a tip face of said optical fiber is protruded into said hollow portion, is formed on a bottom face of said hollow portion, and said tip face of said optical fiber retreats to be led in by 5 to 10 $\mu$m with respect to said front end face of said ferrule, and wherein said hollow portion is filled with a grease-like refractive index matching material, and said tip face of said optical fiber is completely drawn in said grease-like refractive index matching material.

2. The optical connector according to claim 1, wherein said hollow portion has a rectangular opening window.

3. The optical connector according to claim 1, wherein said hollow portion is formed into a slit-shape.

4. The optical connector according to claim 1, wherein said hollow portion has a depth of 20 μm or more.

5. The optical connector according to claim 1, wherein plural optical fiber protrusion ports are provided on the bottom face of said hollow portion corresponding to the number of said optical fibers.

6. A method of assembling an optical connector comprising a ferrule including an optical fiber, the method comprising the steps of:

applying a grease-like refractive index matching material so that said grease-like refractive index matching material enters a hollow portion which is formed on a front end face of said ferrule;

inserting said optical fiber so that a tip face of said optical fiber is protruded from an optical fiber protrusion port, which is formed on a bottom face of said hollow portion, into said hollow portion and said tip face of said optical fiber is completely drawn in said grease-like refractive index matching material; and fixing said optical fiber to said ferrule.

7. The method according to claim 6 including:

before the step of inserting said optical fiber, pressing a ferrule abutment face of an optical fiber press member against said front end face of said ferrule with a positioning protrusive portion of said optical fiber press member entering said hollow portion, said positioning protrusive portion is provided with a flat optical fiber press face which is protruded from said ferrule abutment face by 5 to 10 μm;

the step of inserting said optical fiber including inserting said optical fiber so that a tip face of said optical fiber abuts on said optical fiber press face; and after the step of fixing said optical fiber to said ferrule, removing said optical fiber press member from said ferrule.

8. The method according to claim 6, wherein the tip face of said optical fiber is subjected to an edge removal treatment by an electron discharge machining.

9. The method according to claim 6, wherein the tip face of said optical fiber is subjected to an edge removal treatment by polishing.

* * * * *